Aug. 29, 1939.   R. D. ELLIOTT   2,170,857
RECORDING APPARATUS AND METHOD
Filed Dec. 1, 1937   3 Sheets-Sheet 1

Inventor
Raymond D. Elliott
By Lyon+Lyon
Attorneys

Aug. 29, 1939.                R. D. ELLIOTT                2,170,857
                       RECORDING APPARATUS AND METHOD
                    Filed Dec. 1, 1937        3 Sheets-Sheet 2
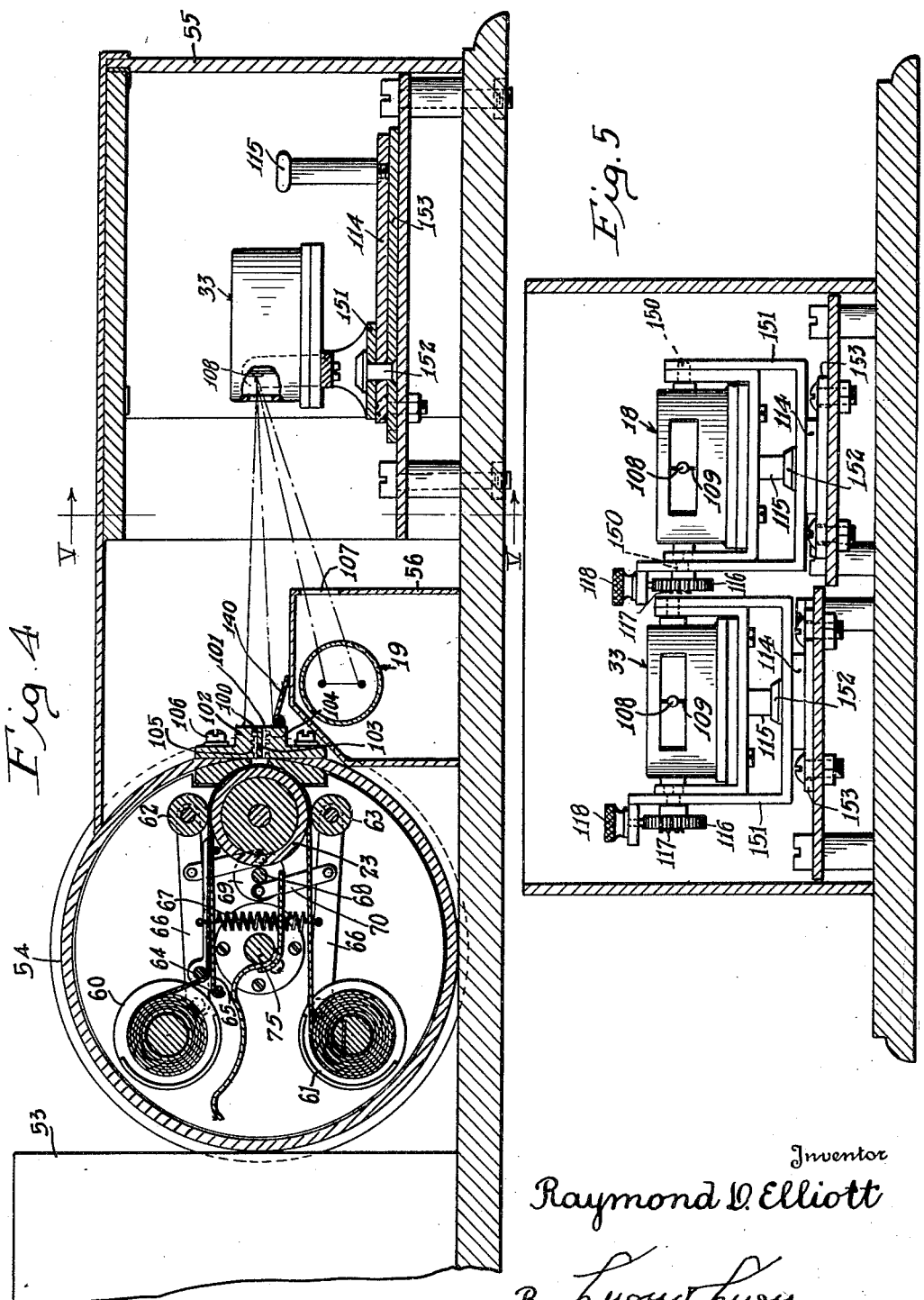
Inventor
Raymond D. Elliott
By Lyon & Lyon
Attorneys

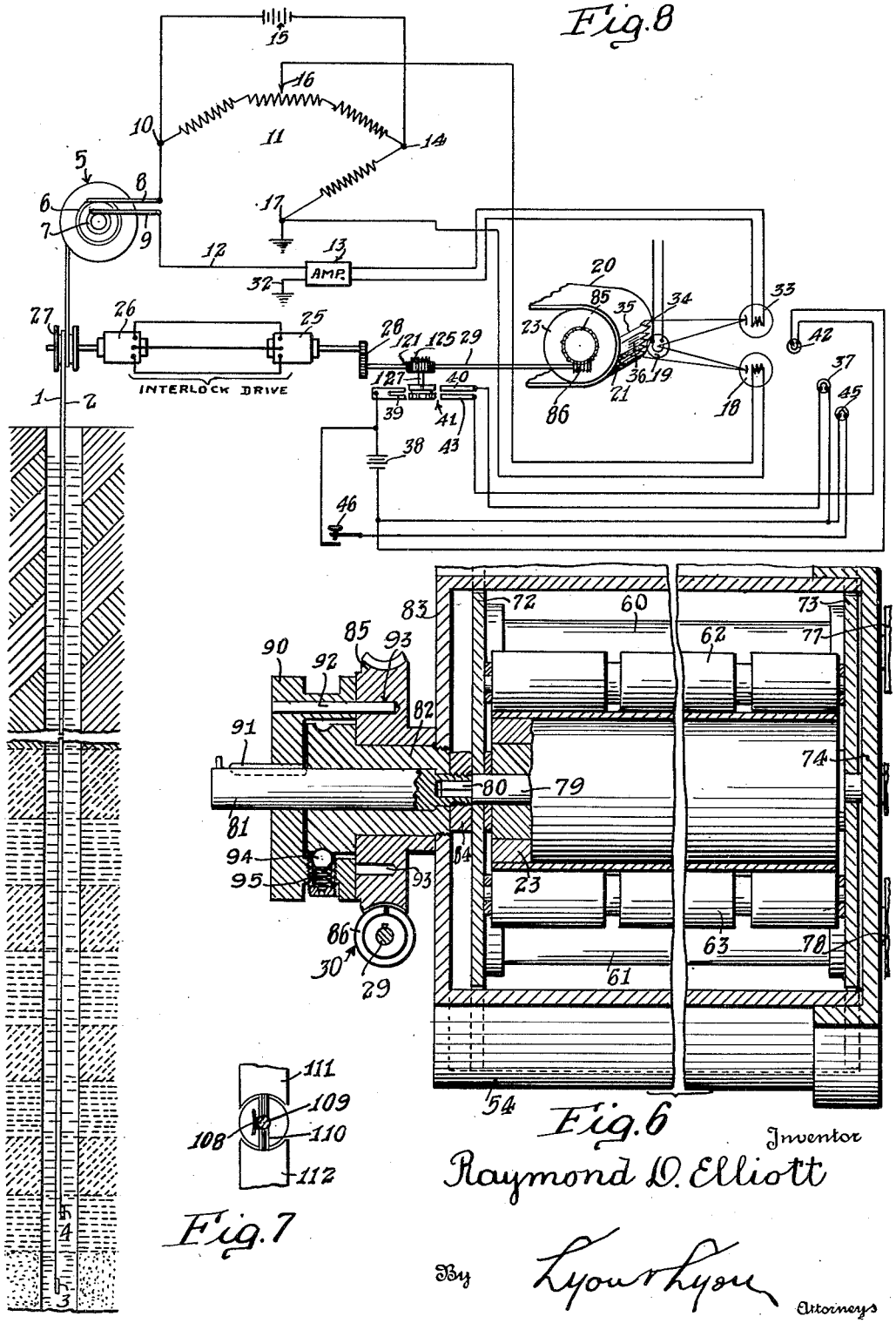

Patented Aug. 29, 1939

2,170,857

UNITED STATES PATENT OFFICE 2,170,857

RECORDING APPARATUS AND METHOD

Raymond D. Elliott, Long Beach, Calif., assignor, by mesne assignments, to Schlumberger Well Surveying Corporation, Houston, Tex., a corporation of Delaware Application December 1, 1937, Serial No. 177,533

15 Claims. (Cl. 175—182)

This invention relates to automatic recording systems for permanently recording desired data in graph form, and is particularly useful in recording the readings of electrical explorations in wells or bore holes, the invention, in part, constituting improvements and refinements in the method and apparatus disclosed in United States patent to F. W. Huber 2,072,950, granted March 9, 1937.

An objective of the invention is to improve the accuracy and interpretive value of electrical well logging records produced in accordance with the aforementioned Huber patent.

Another object is to provide simple and effective apparatus for recording a plurality of graphs on a record strip in predetermined time or space relationship.

Another object is to provide simple and effective apparatus for automatically recording at desired intervals on an oscillogram, datum lines representing predetermined time or space intervals.

Other more specific objects and features of the invention will appear from the detailed description, with reference to the drawings, which follows.

In the aforementioned Huber Patent 2,072,950 an electrical well logging system is disclosed, in which two curves are recorded, one of which curves is indicative of the resistivity of the formation penetrated by a drill hole closely adjacent the hole and the other of which curves is indicative of the resistivity of the formation at a distance spaced out away from the hole. In that system two electrodes suspended on a cable in vertically spaced relation are simultaneously raised and/or lowered through the hole while current is supplied through a bridge circuit to ground and one of the electrodes, hereinafter referred to as the current electrode. As the current electrode traverses the well, the resistance to current flow therefrom varies with changes in the formation, thereby unbalancing the bridge circuit in varying degree, and the variations are recorded on a photographic film with an oscillograph to produce what will hereinafter be referred to as the first curve. At the same time the current flowing out through the formation from the current electrode produces an electric field of varying potential at a distance from the current electrode, which field is impressed on the other electrode, hereinafter referred to as the potential electrode. The potential electrode is connected to a separate movable element in the oscillograph and records a second curve on the photographic film, which curve is a function of the potential of the potential electrode. The patent further explains that the potential of the potential electrode is a function of the resistivity of the formation spaced a distance outwardly or laterally from the bore hole substantially equal to the vertical spacing between the electrodes, this result following from the known fact that in a homogeneous formation the potential at any point in the formation resulting from current flow from a point electrode therein is substantially the same as at all other points in the formation lying the same distance from the current electrode.

In the system of the Huber patent, the record strip containing the two curves mentioned, is calibrated longitudinally in arbitrary units corresponding to predetermined vertical distances in the bore hole and any longitudinal point on the record strip is fixed or identified with respect to the corresponding position of the current electrode in the bore hole. Thus since the variations in the resistance of the circuit including the current electrode is primarily a function of the resistivity of the formation immediately adjacent the current electrode, if any point on the first curve produced with the current electrode is located longitudinally on the record strip at a point corresponding to the position of the current electrode in the bore hole at the same time, then the first curve will accurately indicate the depths in the well or bore hole at which resistance variations immediately adjacent the hole occurred.

Heretofore, to the best of my knowledge, it has been assumed that the potential of the potential electrode at any instant was substantially a function of the resistivity of the formation at the level of the current electrode, but at a point out in the formation spaced horizontally from the current electrode. Therefore, in accordance with prior practice, including the teachings of the Huber patent, it was customary to simultaneously record the two curves at the same level on the record strip, which level corresponded to the position of the current electrode in the hole.

As a result of extensive investigations, I have discovered that the potential of the potential electrode (when the latter is spaced vertically in the bore hole from the current electrode) is a function of the resistivity of the formation at a distance from the bore hole, not at the level of the current electrode, but at a level in between the two electrodes.

In general, I have found that this level is approximately two-thirds of the vertical distance from the current electrode to the potential electrode. Thus if the potential electrode is positioned 15 feet above the current electrode, the potential of the potential electrode will be a function of the average resistivity of the formation spaced a distance away from the hole at a level substantially 10 feet above the current electrode and 5 feet below the potential electrode. In accordance with my invention, I produce records in which the record curve is more truly indicative of the resistivity of the formation spaced from the drill hole at the level indicated on the record, by causing the potential recording device to record at a point on the record strip spaced a distance from the point of recording of the first curve equal to two-thirds of the scale distance between the electrodes. Thus it is common to employ a scale in which one inch on the record corresponds to 50 feet in the well hole and with such a scale, if the potential electrode is positioned 15 feet above the current electrode, then, in accordance with my invention, the point of recording the second curve on the record strip should be approximately one-fifth of an inch above the point of recording of the first curve.

Obviously, if the potential electrode is positioned below the current electrode, instead of above it, the point of recording the second curve on the record strip is to be positioned below the point of recording of the first curve.

The methods and apparatus which may be employed in practicing the invention will now be explained by describing in detail a preferred embodiment thereof, with reference to the drawings, it being understood that various additions and modifications may be made to the particular apparatus and procedures described without departing from the invention.

In the drawings:

Fig. 4 is a longitudinal vertical section taken approximately along the line IV—IV of Fig. 1;

Fig. 5 is a vertical cross section taken approximately along the line V—V of Fig. 4;

Fig. 6 is a contracted vertical cross section taken approximately along the line VI—VI of Fig. 1;

Fig. 7 is a detail horizontal section showing the mounting of the instrument mirrors; and Fig. 8 is a schematic diagram showing a simple electrical circuit that may be employed with the apparatus.

Figure 1:
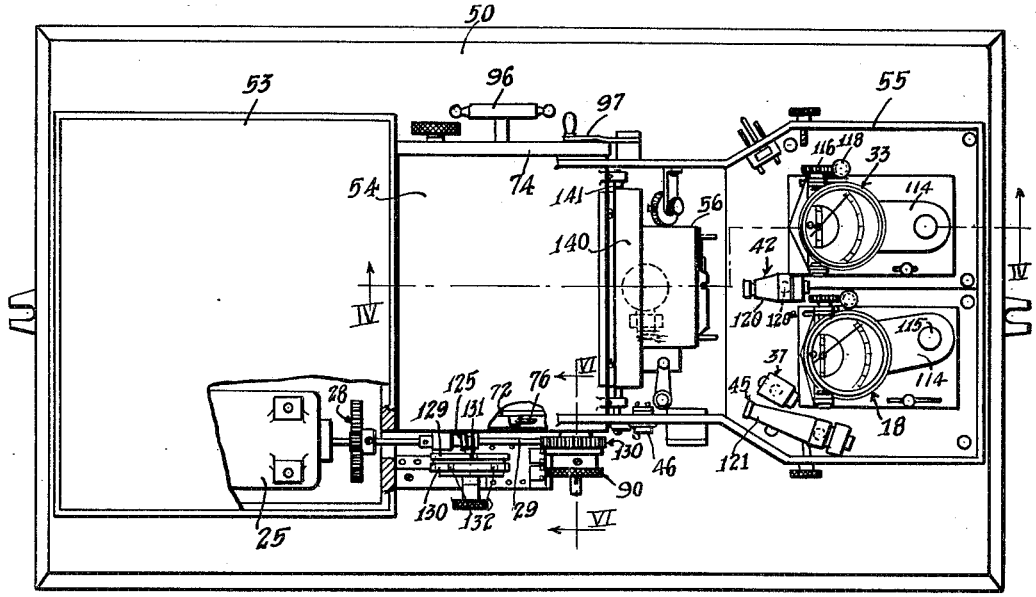
Fig. 1 is a plan view of a recorder in accordance with the invention.

Referring first to Fig. 8, a general system for electrical logging of wells is schematically disclosed as comprising a pair of insulated cable conductors 1 and 2, respectively, having on their lower ends electrodes 3 and 4, respectively, which conductors are adapted to be wound upon or unwound from a winch 5 to raise and/or lower the electrodes 3 and 4 in a well to be logged. The upper ends of the cable conductors 1 and 2 are connected through slip rings 6 and 7 and brushes 8 and 9 to the energizing and recording apparatus at the surface. Thus the electrode 3 is connected through cable conductor 1, slip ring 6 and brush 8 to one diagonal point 10 of a Wheatstone bridge circuit 11, and the other electrode 4 is connected through cable conductor 2, slip ring 7, and brush 9 to one of the input conductors 12 of an amplifier 13.

The bridge 11 is energized by current from a battery 15 connected between the diagonal point 10 on the bridge and an opposite diagonal point 14. The two remaining diagonal points 16 and 17 of the bridge are connected to a recording galvanometer 18 adapted to reflect a beam of light from a lamp 19 onto a moving photographic film 20 to produce a record curve 21. The diagonal point 17 on the bridge is grounded so that the circuit between points 17 and 10, constituting one arm of the bridge, includes the input or current electrode 3, as it will hereinafter be termed, and the path back to ground through the adjacent formation. As the electrode 3 is moved past formations of different resistivity the bridge 11 is unbalanced in varying degree, thereby actuating the galvanometer 18 so that the curve 21 is a function of the variation in the resistivity of the formation immediately adjacent the electrode 3.

The film 20 is moved in synchronism with the movement of the electrodes 3 and 4 and at a predetermined speed relative to the speed of the electrodes. To this end the film 20 is moved by a drive roller 23, which is rotated by a winding mechanism actuated by a motor 25 which is electrically controlled to move in synchronism with a control generator 26 driven in synchronism with the movement of the conductors 1 and 2. Thus the device 26 is shown actuated by a drum 27 about which the conductors 1 and 2 are wound at a point between the winch 5 and the mouth of the well. Electrical synchronous drive devices are old in the art, and need not be described in detail herein. Thus the devices 25 and 26 may be a pair of Selsyn motors, which, as is well-known, always move in exact synchronism with each other. In the schematic showing of Fig. 8, motor 25 is shown connected by gears 28 to a shaft 29 which is connected by a worm 86 and wormwheel 85 to the shaft of the winding roller 23.

As previously indicated, the electrode 4, which will hereinafter be referred to as the secondary or potential electrode, is connected through the cable conductor 2, slip ring 7 and brush 9 to one of the input conductors 12 of the amplifier 13. The other input terminal 32 of the amplifier is connected to ground so that the potential of the electrode 4 with respect to ground is always applied to the input of amplifier 13. The output of amplifier 13 is shown connected to a galvanometer 33 adapted to reflect a beam of light from the lamp 19 into the film 20 to produce thereon a curve 34 which is a function of the potential of the electrode 4.

There are also recorded on the film 20, long transverse lines 35 spaced substantial intervals apart, and short transverse lines 36 spaced close together, representing in any desired units the distance traversed by the electrodes 3 and 4 during a recording period. It has been convenient in practice to space the lines 35 at longitudinal distances on the film 20 representing the distance of travel of the film during movement of the electrodes in the hole of 100 feet and to space the short lines 36 a distance apart corresponding to 10 feet of movement of the electrodes in the well. These lines 35 and 36 are automatically recorded by momentarily projecting light through slits in a screen positioned in front of the film. This screen is not illustrated in Fig. 8, but will be described in detail later with reference to the actual apparatus employed. Suffice it to say at this point that the lines 35 are produced by directing light through a suitable slit in a screen from a lamp 37 connected in series with a battery 38 and contacts 39 and 40 of a switch mechanism 41 actuated from the shaft 29 which is driven in synchronism with the movement of the electrodes in the hole. Thus the contacts 39 and 40 of switch 41 are momentarily closed, in a manner to be described in detail later, at intervals corresponding to movement of the electrodes 3 and 4 through 100 feet. The short lines 36 are recorded by projecting light through a slit in the screen from a second lamp 42, which is also connected in series with the battery 38 through contacts 39 and 43 of switch 41. These contacts 39 and 43 are momentarily closed by the switch 41, as will be described in detail later, in response to movement of the electrodes 3 and 4 through distances of 10 feet.

To permit arbitrary marking of the film 20 at any point thereon, a third lamp 45 is connected in series with the battery 38 and a push button 46.

The positions of the lines 35 and 36 on the film 20 is determined with reference to the current electrode 3. Thus the apparatus is so set when the surveying of a well is commenced that the particular one of the lines 35 corresponding to zero depth in the well is recorded on the film while the electrode 3 is exactly at the mouth of the well. It follows that since any point on the curve 21 represents the resistivity of the formation immediately adjacent and at the same level as electrode 3, the beam from the galvanometer 18 should be arranged to impinge on the film 35 at the same level thereon as the light from lamp 37. The manner in which this result is attained will be explained in detail with reference to Figs. 1 to 6 of the drawings.

However, as previously mentioned, the potential of the electrode 4 is a function of the resistivity of the formation spaced outwardly away from the bore hole and at a level above the level of electrode 3 (when the potential electrode 4 is positioned above the current electrode 3, as shown in Fig. 8). Therefore, the apparatus is arranged, in a particular manner to be described later, so that the beam of light reflected from the galvanometer 33 impinges on the film 20 at a level thereon above the point of impingement of the beam from the galvanometer 18. For purposes of clearity, the beam from the galvanometer 33 has been shown in Fig. 8 as impinging upon the film 20 at a point a substantial distance above the level at which the beam from galvanometer 18 strikes the film. However, in actual practice this distance is relatively small, being, as previously indicated, a small fraction of an inch when the electrodes in the hole are spaced a distance of approximately 15 feet, and the scale employed is 1 inch to 50 feet.

A particular construction of recording apparatus for use in a system of the type shown schematically in Fig. 8, will now be described with reference to Figs. 1 to 7, inclusive.

Figure 2:
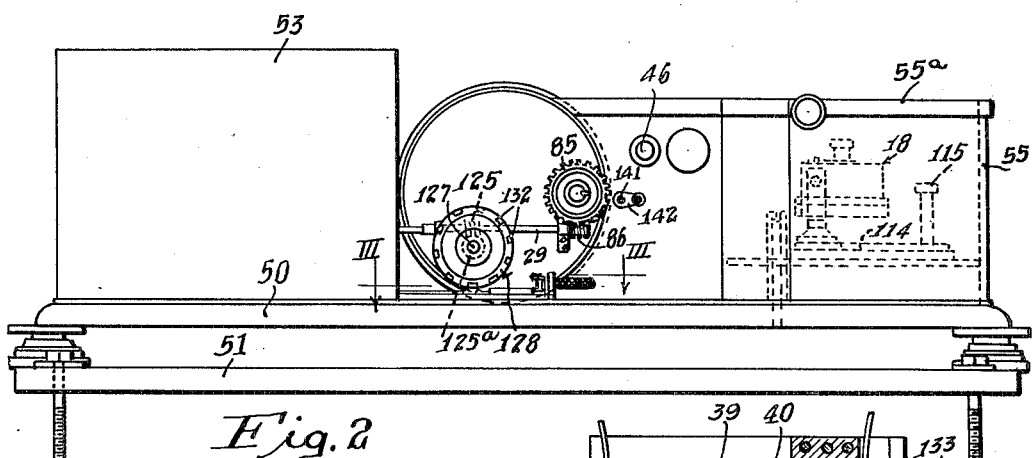
Fig. 2 is a front elevation view of the recorder shown in Fig. 1.
Figure 3:
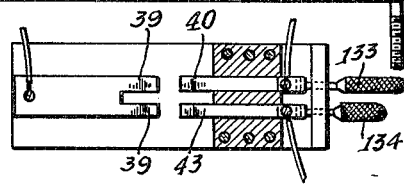
Fig. 3 is a detail sectional view taken approximately along the line III—III of Fig. 2.

Referring to Figs. 1 and 2, the recorder therein depicted comprises a base 50 which may be resiliently supported from a sub-base 51 which in turn may be supported on any suitable table or other supporting means. The base 50 has directly mounted thereon the recording equipment proper which includes an amplifier casing 53 containing the amplifier 13 of Fig. 8, the elements of the bridge 11 and various current supply equipment and instruments. The casing 53 also includes the synchronous motor 25 which, as previously described, is controlled by a suitable control device associated with the cable lowering and raising apparatus at the well hole.

Positioned closely adjacent the amplifier casing 53 is a film box 54 which contains the film on which the record is to be taken and the mechanism for moving the film during a recording. Mounted against the side of the casing 54 opposite the amplifier casing 53 is a light-proof enclosure 55 having a light-tight removable cover plate 55a, and containing the galvanometers 33 and 18, the lamp 42, the lamp 37 and the lamp 45. Also positioned completely within the housing 55 is a lamp housing 56 which contains the lamp 19 which supplies beams of light to the mirrors of the galvanometers 33 and 18.

Referring now to Fig. 4, the film box 54 contains a pair of film supporting spools 60 and 61, respectively, the film drive roller 23 and a pair of idler rollers 62 and 63, respectively. The film extends from the spool 60 below a guide roller 64 and along a guide plate 65, thence between the driver roller 23 and the idler roller 62, halfway around the drive roller 23, under the idler roller 63 and thence to the spool 61. Each of the idler rollers 62 and 63 is rotatably supported at opposite ends by a pair of arms 66, which are urged together to press the rollers 62 and 63 against the drive roller 23 by tension springs 67. To facilitate changing a film, the idler rollers 62 may be readily separated against the force exerted by the springs 67 by rotating a shaft 68 having mounted thereon a pair of discs 69, which are connected by links 70 to the levers 66. Rotation of the shaft 68 through 90° forces the arms 66 a substantial distance apart, thereby carrying the idler rollers 62 and 63 away from the drive roller 23.

The film spools 60 and 61, drive roller 23, the idler rollers 62 and 63, and the shaft 68 are all rotatably supported betwen a pair of end discs 72 and 73, respectively (Fig. 6) which constitutes a unitary assembly removable as a whole from the film box 54. Thus at its rear end (with reference to Fig. 1), the film box 54 is provided with a removable end closure plate 74, which, when in place, forms a light-tight closure for the box 54. The end closure plate 74 is attached to the end disc 73 and the latter is attached to the end disc 72 by a central cross member 75 (Fig. 4). The entire assembly of film spools, rollers, etc., is removed from the film box 54 with the cover plate 74, for reloading with film. The shaft 68 (Fig. 4) has attached thereto a handle 76 (Fig. 1) positioned exterior of the end disc 72, which is readily accessible for effecting separating movement of the idler rollers 62 and 63 when the inner assembly is removed from the film box 54. The film spools 60 and 61 fit between holders of conventional construction rotatably mounted in the end discs 72 and 73, and knobs 77 and 78 are provided exterior of the closure plate 74 for manual rotation of the film spools.

The film driving roller 23 is non-rotatably mounted on a shaft 79 journaled in the end discs 72 and 73 and having a square outer end 80 (Fig. 6) extending beyond the end disc 72 for engagement with a square recess in the inner end of a drive shaft 81 which is rotatably mounted in a bearing member 82 rigidly secured to the outer end wall 83 of the film box. A spacer nut 84 threaded onto the inner end of the shaft 81 within the film box, fixes the shaft 81 against longitudinal motion within the bearing member 82.

There is rotatably mounted on the exterior surface of the bearing member 82 the wormwheel 85 which is in driven engagement with the worm 86 keyed to the shaft 29 which extends into the amplifier casing 53 and is driven through reduction gears 28 by the motor 25 A clutch connection is provided between the wormwheel 85 and the shaft 81, this connection including a handwheel 90 keyed to the shaft 81 by a key 91 for longitudinal motion therealong, the knob 90 having a pin 92 therein which extends into one of a plurality of recesses 93 provided in the outer periphery of the wormwheel 85 The clutch member 90 is normally retained in innermost position, as shown in Fig. 6, by a ball detent 94 which is pressed by a spring 95 into engagement with an annular groove in the bearing member 82. However the knob 90 may be pulled outwardly to disengage the pin 92 from whichever recess 93 it happens to be engaged in, and by then rotating the knob 90 the drive roller 23 may be rotated independently of the wormwheel 85. The clutch mechanism described permits ready engagement and disengagement of the drive roller into and out of driven relation with the motor 25.

The end closure plate 74 is provided with a handle 96 (Fig. 1) rigidly attached thereto to facilitate removal of the cover plate and the film winding and supporting mechanism thereon. A latch arm 97 is provided to hold the cover plate 74 in place.

When the knob 90 is in normal position, as shown in Fig. 6, the film driving roller 23 is rotated at a definite speed by the motor 25 in synchronism with the movement of the electrodes in the well to thereby move the film past a pair of recording slits 100 and 101 (Fig. 4), respectively, in the side of the film box 54 facing the galvanometers 33 and 18, and light from the mirrors on the galvanometers and from the various marking lamps is transmitted through these slits 100 and 101 to effect desired recording on the film It is to be understood that the direction in which the film travels is determined by the direction in which the electrodes 3 and 4 are moving in the well. Thus if a record is made while the electrodes are being lowered into the well, then the motor 25 runs in such a direction as to move the drive roller 23 in counter-clockwise direction (with reference to Fig. 4), thereby carrying the film upwardly past the slits 100 and 101. On the other hand, if the record is made while the electrodes 3 and 4 are being raised in the well, then the motor 25 runs in such a direction as to rotate the drive roller 23 in clockwise direction, carrying the film downwardly past the slits 100 and 101.

As shown in Fig. 4, the light slits 100 and 101 are defined by three blocks 102, 103 and 104, respectively. The center block 103 is stationarily mounted on the film box 54 at its opposite ends and is provided with smooth upper and lower surfaces which define the lower wall of the upper slit 100 and the upper wall of the lower slit 101. The block 102 is adjustably supported on the housing 54 to permit adjustment of the width of the slit 100 and the lower surface of this block, which defines the upper wall of the slit 100, is provided with a plurality of grooves 105 extending transversely to the direction of light transmission through the slit, which constitute light traps to intercept and absorb light that is not traveling parallel to the parallel walls of the slit. The wall surfaces of the slits are preferably made as nearly completely light-absorbent as possible by coating them with a black paint or other light-absorbing substance. As shown in Fig. 4, block 102 is supported on the film box 54 by a screw 106. The lower block 104 is identical with block 102 and it is secured to the housing in the same way.

The lower slit 101 functions to determine the level on the film at which the first curve, which is a function of the resistance adjacent the current electrode 3, is recorded. The upper slit 100 determines the level on the film at which the second curve which is the function of the potential of the potential electrode 4 is recorded. As previously indicated, I have discovered that the first and second curves should be recorded at different levels on the film corresponding to substantially two-thirds of the distance (reduced to scale) between the electrodes 3 and 4. A spacing that is commonly employed between the electrodes 3 and 4 is 15 feet and a scale that is commonly used in the recording is 50 feet to the inch; i. e., 50 feet in the well equals 1 inch on the film record. Under such conditions the spacing between the slits 100 and 101 will be approximately ⅕ of an inch.

Each of the slits 100 and 101 extends across the film housing 54 substantially the full width of the film employed. To cause recording light to pass one of the slits 100 or 101 and not pass the other slit, each light source is accurately alined with the slit 100 or 101, through which it is intended to record, and is out of alinement with the other slit.

As previously indicated, the first and second curves are recorded by reflecting light from the lamp 19 onto the film with mirrors on the galvanometers.

Referring to Fig. 4, the lamp 19 is mounted within the light-tight casing 56 positioned within the housing 55. The casing 56 is mounted below the level of the slits 100 and 101 and is provided with windows 107 through which light is transmitted to the galvanometers. The galvanometers 18 and 33 may be of any desired construction, but I have found it convenient to use conventional milliammeters having the usual hands and scales, with tiny concave mirrors 108 (Fig. 7) mounted on the shafts 109 of the instruments at points vertically disposed from the movable coils of the instruments. Fig. 7 shows a conventional meter construction in which the coil 110 is positioned between pole pieces 111 and 112 of a permanent magnet. The concave mirrors 108 have a curvature such as to focus an image of the filament across the slits 100 and 101 of the lamp 19. The lamp 19 preferably has a straight filament positioned substantially vertical so that the mirrors 108 of the galvanometers focus a vertical line of light across the recording slits 100 and 101. Under these conditions, the area of the spot of light striking the film is determined by the width of the vertical lines of light reflected by the mirrors 108 and the width of the slits 100 and 101.

To permit light from each of the mirrors of the two galvanometers 18 and 33 to be reflected through one of the slits and prevent it from being reflected through both of the slits 100 and 101, the galvanometers are positioned at different levels, as shown in Fig. 5. Thus the galvanometer 33 is positioned vertically at a level above the level of galvanometer 18, the mirror of galvanometer 33 thereby being accurately alined with the slit 100 and the mirror of galvanometer 18 being accurately alined with the lower slit 101. Therefore, although the mirror of galvanometer 33 projects a line of light which impinges on the orifices of both slits 100 and 101, such light passes only through slit 100 because the light from this mirror that reaches the orifice of the slit 101 is directed out of parallelism with the slit 101 and is intercepted by the pockets 105 in the lower wall of the slit, and thereby prevented from reaching the film. Similarly, the light reflected from the mirror of the galvanometer 18 is alined with lower slit 101, passes through the slit and effects a recording on the film, whereas the light from this mirror is out of parallelism with the slit 100 and is intercepted by the grooves 105 in the upper wall thereof and is unable to reach the film.

The galvanometers 18 and 33 are permanently mounted with their mirrors alined with the associated slits 101 and 100, respectively, but provision is made for swinging adjustment of the galvanometers both horizontally and vertically without changing the levels of the mirrors. Thus referring to Fig. 5, each galvanometer is provided with trunnions 150, the axis of which extends through the mirror 108 and the trunnions are rotatably supported in a U-shaped frame member 151 which is rotatably supported for movement in a horizontal plane by a pin 152 (Fig. 4) on a base member 153, the axis of the pin 152 likewise extending through the mirror of the galvanometer. A plate 114 is secured to each U member 151 and extends rearwardly therefrom and has a handle 115 on the rear end. Each galvanometer may therefore be rotated about a vertical axis extending through its mirror by grasping the handle 115 and swinging the plate 114 laterally to adjust the mean positions of the light spots laterally on the film. Likewise each galvanometer may be swung about a horizontal axis extending through the mirror by swinging the galvanometer on the trunnions 150. To facilitate the latter adjustment and retain the galvanometer in adjusted position, a worm wheel 116 may be provided on the extended end of one of the trunnions 150, which wormwheel may be actuated by a worm 117 on a shaft having a thumb-piece 118.

The use of the instruments 18 and 33 having hands operating over calibrated scales and also mirrors for reflecting light beams to the film, is highly advantageous since it permits rapid checking of the proper operation of the instruments by direct inspection without the necessity of making a test film record, or lighting the galvanometer lamps.

As previously indicated, the galvanometer 18 records the first curve 21 which is a function of the resistivity of the formation immediately adjacent the electrode 3, and it is desirable that the spaced datum lines 35 and 36 (Fig. 8) be recorded on the film at the level of recordation of the first curve. Proper coordination between the curve and the datum lines is readily obtained if the datum lines are recorded on the films by light transmitted through the same slit 101 that the first curve 21 is recorded through. To this end the lamps 37, 42 and 45 are positioned at the same level and in alinement with the lower slit 101. The lamp 37 produces the long marks 35 extending all the way across the film and to this end it is of such a character as to cast light over the entire length of the slit 101. The lamp 42, on the other hand, is intended to produce only the short lines 36 shown positioned substantially at the center of the film in Fig. 8, and this lamp therefore comprises a bulb 120a (Fig. 1) enclosed in a shield 120 which permits light to impinge against the orifice of the slit 101 only over a short area adjacent the center thereof. The lamp 45, as previously indicated, is provided for the purpose of making arbitrary identification marks of short length on one margin of the film and this lamp therefore comprises a housing 121 which confines the light to a small portion of the slit 101 adjacent one end thereof.

Each of the lamps 37, 42 or 45 should be energized only momentarily to produce a narrow transverse line on the film of width substantially equal to the width of the slit through which the light is directed. The slits 100 and 101 are preferably only about .008 or .009 of an inch in width. Should any lamp remain illuminated for a substantial interval of time, the film would travel an appreciable distance past the slit during the period of illumination, thereby producing a wide line. If desired, a wider line may be produced to distinguish any particular levels by illuminating the lamp for a longer interval of time. It is also possible to produce a wider line by increasing the intensity of the light, due, in the main, to the halation effect produced on the film.

The lamps 37 and 42 are automatically energized in synchronism with the movement of the film and the well electrodes to record the lines 35 and 36 at predetermined definite spaced intervals on the film corresponding to the scale employed. The switch 41, for effecting this automatic energization of the lamps 37 and 42, has been briefly referred to hereinbefore. It will now be described in greater detail with reference to Figs. 1, 2, and 3. Thus, as shown in Fig. 1, the shaft 29, on which is mounted the worm 86 for driving the film-driving roller, also carries a worm 125 which meshes with a wormwheel 125a on a rotatable shaft 127 carrying a commutator 128. The commutator 128 consists of two discs 129 and 130 of insulating material having mounted in their peripheries short segments of metal. The disc 129 carries only one segment, whereas the disc 130 carries nine segments 132, spaced from each other about the periphery. Conductive segment 131 cooperates with two contact springs 39 and 40 (Fig. 3) connected in series with the battery 38 and the lamp 37, momentarily closing these contacts 39 and 40 once during each revolution of the commutator 128, and the speed ratio between the commutator 128 and the drive roller 23 is such that the lamp 37 is flashed at intervals corresponding to a film travel of 2 inches, which is equivalent to 100 feet travel of the electrodes in the well. Disc 130 bearing the nine segments 132 is so oriented with respect to the disc 129 as to close the contacts 39 and 43 at nine equally spaced intervals between successive closures of contacts 39 and 40 to energize the lamp 42 and record the central short marks 36 corresponding to 10-foot intervals in the well.

The contact structure described permits of accurate adjustment to obtain a very short contact period and thereby prevent the production of wide lines on the film due to the movement of the film during the process. Thus referring to Fig. 3, the contacts 40 and 43 are mounted for longitudinal sliding movement and are controlled by thumb-screws 133 and 134. By adjusting the springs 40 and 43 longitudinally with the adjusting screws 133 and 134, the spacing between contacts 39 and 40 and between contacts 39 and 43, may be adjusted to a distance barely less than the peripheral length of the segments 131 and 132 so that those segments barely make contact on one of the contacts 39 or 40 (or 39 and 43) before they break with the other contacts.

To permit testing and adjusting without fogging a film through the slits 100 and 101, a shutter door 140 (Fig. 4) is provided, which is adapted to swing up against the surfaces of the slits and prevent the entry of light therein. This door 140 is mounted on a shaft 141 (Fig. 2) which extends through the wall of the housing 55 and is provided with an arm and handle 142 on its outer end to permit actuation of the door 140 with the cover 55a in position.

The device is operated as follows:

Assume that a record is to be made while running the electrodes 3 and 4 upwardly through the well from the bottom to the top. The end plate 74 and the assembly of film rollers and guides mounted thereon is removed from the film box 54. A full spool of unexposed film is inserted in the position of the spool 60, an empty film spool is inserted at the position 61, and the film is threaded from the spool 60 under the roller 64, between the rollers 62 and 63 and the drive roller 23, and thence to the empty spool 61, where the end of the film is anchored in the usual way. During the threading of the film around the drive roller 23 the idler rollers 62 and 63 are separated by rotating the shaft 68. It is understood that the film employed may, in accordance with standard practice, have secured thereto a leader paper and a follower paper extending beyond the end of the film so that the loading process may be performed in the light without fogging the film. After the film has been loaded in the manner described, the entire assembly is inserted in the film box 54 and the latter secured in position with the latch arm 97. At this time the shutter door 140 is in closed position against the slits 100 and 101 to prevent fogging the film. The film may then be initially wound to proper position to permit the exposure by rotating the knob 78 to turn the take-up spool 61. At this time the drive roller 23 is disconnected from the motor 25 by pulling the knob 90 to disengage the pin 92 with the recesses 93 in the wormwheel 85. With the electrode 3 positioned at the mouth of the hole, the motor 25 is then rotated by hand, if necessary, to bring the segment 131 in disc 129 in position to close contacts 39 and 40, so that in the finished record the long lines 35 will indicate 100-foot intervals measured from the mouth of the well.

With the knob 90 still pulled out to disconnect the wormwheel 85 from the film drive roller 23, and with the shutter 140 closed, the electrodes 3 and 4 are lowered into the hole to the point where it is desired to begin the survey. Usually it is desired to survey the entire well and the winch is brought to rest with the electrode 3 at the bottom. During the downward movement of the electrodes in the well, the switch 41 is actuated to illuminate the lamps 37 and 42 at definite intervals but the film is unexposed because the shutter 140 is closed.

However, when the electrodes have been lowered into the position from which the survey is to be started, the knob 90 is pushed in to engage the pin 92 with one of the recesses 93 in wormwheel 85, turning the knob and the film drive roller 23 slightly, if necessary, to effect engagement, the shutter 140 is opened, and the winch 5 is actuated to raise the electrodes 3 and 4 at any desired speed. Regardless of the speed of movement of the electrodes, the interlock drive comprising the electrical machines 26 and 25 maintains the speed of the film drive roller 23, and therefore the speed of the film, proportional to the speed of the electrodes. The drive roller 23 rotates in such direction as to move the film downwardly past the recording slits 100 and 101, and the beam of light from lamp 19, reflected by the mirror of galvanometer 18 through the slit 101, records the first curve 21 at a level on the film corresponding to the depth identified by the marks 35 and 36, which are produced at intervals by light transmitted from the lamps 37 and 42 through slit 101 as the segments 131 of the commutator disc 129 closes the contacts 39 and 40 and the segments 132 of the commutator disc 130 close the contacts 39 and 43. At the same time the second curve 34 is recorded on the film at the desired higher level thereon with respect to the levels indicated by the lines 35 and 36, with light from the lamp 19 reflected through the slit 100 by the mirror of the galvanometer 33.

As the film is slowly fed from the spool 60 by the drive roller 23, it builds up slack between the idler roller 63 and the spool 61 and the slack film may be wound up onto the spool 61 at intervals by rotating the knob 78 which is in driving engagement with the spool 61.

When the electrode 3 reaches the mouth of the well the survey is completed, and the winch 5 is stopped. The exposed film may then be removed by first turning the spool 61, by means of knob 78, to wind all of the film onto the spool 61 and then wind the end strip of backing paper on the film around the spool to protect the film from light, after which the spool may be removed for development by opening the film box and removing the entire assembly therefrom in the manner previously described.

It is usually equally preferable to conduct a survey during movement of the electrodes from the bottom of the well to the top. This prevents any errors due to projections in the hole which might catch and hold the electrodes while they are being lowered. When the electrodes are being raised they cannot stop without stopping the movement of the winch and such movement, of course, stops the recording apparatus. On the other hand, if the electrodes should catch in the well while they are being lowered, the weight of the conductors 1 and 2 would continue to carry the conductors into the hole, and the recording apparatus would continue to run despite the fact that one or both of the electrodes was not moving.

It is the usual practice, however, while lowering the electrodes in the hole to have the cover plate 55a removed and observe the hands of the instruments 33 and 18 to get a general idea of the character of the currents and potentials that are being developed. The operator can also tell by watching the instruments whether or not the electrodes have become caught in the bore hole. Ordinarily, when the electrodes are moving continuously, the readings of the meters are continuously fluctuating, whereas, if the electrodes become caught in the hole, the hands of the instruments remain in fixed position.

It is to be understood, however, that the apparatus described functions equally well for making surveys while the electrodes are being lowered into the well, aside from the possibility of the electrodes being hung up. Of course if the recording is to be made while running the electrodes into the well, the positions of the full and empty film spools are reversed. No other adjustments are required, since the interlock drive automatically drives the film drive roller 23 in the proper direction relative to the direction of movement of the electrodes in the well.

Although in the schematic drawing of Fig. 8 the conductors 1 and 2 have been shown as two separate and distinct wires, it is to be understood that in practice these conductors are insulated from each other and are included in a single cable.

For the purpose of explaining the invention, a specific, relatively simple circuit that may be employed has been described in detail. It is to be understood, however, that various changes in the circuit details and in the apparatus may be made without departing from the invention, and the latter is to be limited only to the extent set forth in the appended claims.

I claim:

1. A method of producing a log of geological formations penetrated by a hole containing conductive liquid, which comprises moving a pair of vertically spaced electrodes along said hole, passing current from one of said electrodes into the surrounding formation, whereby an electric field is produced in the formation surrounding the electrode, moving a record-receiving strip in a predetermined direction in synchronism with the movement of said electrodes in the hole, recording a line on said strip as it moves past a fixed path transverse to the strip and varying the lateral position of the point of recording said line in response to variations in resistance to passage of said current from said one electrode, identifying longitudinal points on said record with respect to the position of said one electrode in the hole at the instants of recordation of said line at those points, simultaneously recording a second line on said strip as it moves past a second fixed path transverse to the strip, and varying the lateral position of the point of recording said second line in response to variations in the potential of the other electrode, in which said second transverse path is spaced longitudinally from said first transverse path a scale distance equal to a predetermined fraction of the vertical spacing between said electrodes.

2. The method of producing a log of geological formations penetrated by a drill hole containing conductive liquid, which log comprises a record strip having longitudinally spaced marks thereon identifying different levels in the hole, and a first record indicating resistivity changes of the formation closely adjacent the hole at the indicated levels therein, and a second record indicating resistivity changes of the formation at a predetermined lateral distance from the holes at the same levels, said method comprising: moving a pair of electrodes through said hole, while maintaining said electrodes spaced apart vertically substantially said predetermined distance, passing current from one of said electrodes into the surrounding formation, producing said first record by recording on said record strip at longitudinal points thereon corresponding to the instant levels of the first electrode in the hole, an indication of the resistance variations in the electric circuit including said one electrode and the formation surrounding it, and producing said second record by recording on said strip at longitudinal points thereon spaced from the position corresponding to the instant level of the first electrode in the hole, indications of the potential variations of said second electrode, said points of recording said second record being spaced longitudinally from points in said first record corresponding to the level in the well of the first electrode approximately two-thirds of the scale distance between said electrodes.

3. The method of determining the character of geological formations penetrated by an uncased bore hole filled with conductive liquid which comprises passing a current between ground and an electrode traversing the bore hole, whereby an electric field is produced in the formation surrounding the said electrode, recording the direction and approximate relative magnitude of variations of said current from an arbitrary reference value in the form of a continuous graph on a record strip, said variations resulting from changes in the formation closely adjacent the moving electrode, simultaneously recording in the form of a continuous graph the direction and proximate relative magnitude of variations from an arbitrary reference value of the potential of said electric field at a moving point in said bore hole spaced a fixed distance from said moving electrode and so coordinating said two graphs that simultaneously recorded portions of the two graphs are spaced longitudinally a scale distance corresponding to approximately two-thirds of the distance between the electrodes in the hole.

4. Apparatus for exploring the formation traversed by a drill hole containing conductive fluid comprising a cable including a pair of insulated conductors, said insulated conductors having connected thereto a pair of spaced apart electrodes, means for moving said cable and said electrodes through the drill hole, means for impressing a substantially constant potential between ground and said one electrode. a record strip and means for moving it longitudinally in synchronism with the movement of said electrodes in the hole, means for measuring variations in the resistance between ground and said one electrode, and means for measuring the potential variations between ground and the other electrode as said cable is moved through the drill hole, said two measuring means each including a laterally movable longitudinally fixed recording means for recording a line on said strip as the latter moves, the lateral position of each line at any point therealong representing the magnitude of the variations measured by the associated measuring means, said recording means being so positioned that the recording means associated with said other electrode records on said strip at a point thereon spaced longitudinally from the point of recording of the means associated with the said one electrode approximately two-thirds of the scale distance on the strip equal to the spacing between the electrodes.

5. Apparatus as described in claim 4, with means for producing longitudinally spaced marks on said strip directly indicative of the depth of the said one electrode in the well.

6. Apparatus for making a plurality of graphic records on a light sensitive strip in predetermined longitudinally spaced relation comprising a light-tight housing including a wall member of substantial thickness having a plurality of elongated slits therein, means in said housing for moving a light sensitive strip successively past said different slits, and a plurality of recording means each adapted to direct light against the outer orifices of all of said slits, in which the inner orifices of said slits are spaced apart in the direction of travel of said strip therepast distances corresponding to the desired longitudinal spacing between the different graphic records to be recorded on the strip, and each recording means is alined with one of said slits and is out of alinement with the other slit, whereby it transmits a recording light beam to said strip through only one of said slits.

7. Apparatus as described in claim 6, in which one at least of said recording means projects a thin, flat light beam against said slits, said beam being wide in the direction transverse to said slits and narrow in the longitudinal direction of the slit, and means for moving said beam along said slits to project a spot of light on said strip, through the slit alined with said beam-producing means.

8. Recording apparatus comprising a light-tight housing having a plurality of recording slits therein, means for moving a light sensitive strip past said slits within said housing, a plurality of recording means for directing laterally movable and laterally constricted beams of light through said slits to record on said strip a plurality of curves, each displaced longitudinally by a predetermined distance, the longitudinal position of any point on which is determined by the position of the strip relative to the slits at the instant of recording, and means for recording longitudinally spaced transversely extending reference lines on said strip coordinated with longitudinal points on one of said curves, comprising means operated in synchronism with said strip-moving means for momentarily directing light through one of said slits at definite intervals with respect to movement of said strip.

9. Recording apparatus comprising a light-tight housing having a plurality of recording slits therein, means for moving a light sensitive strip past said slits within said housing, a plurality of recording means for directing laterally moving and laterally constricted beams of light through said slits to record on said strip a plurality of curves, each displaced longitudinally by a predetermined distance, the longitudinal position of any point on which is determined by the position of the strip relative to the slits at the instant of recording, and means for recording longitudinally spaced reference lines on said strip coordinated with longitudinal lines on one of said curves, comprising first means operated in synchronism with said strip moving means for momentarily directing light through one of said slits over a substantial portion of the length thereof, at definite intervals with respect to movement of said strip, and second means for momentarily directing light through said same slit over a lesser portion of the length of the slit at definite intervals shorter than said first intervals.

10. Recording apparatus comprising a light-tight housing having a plurality of recording slits therein, means for moving a light sensitive strip past said slits above said housing, a plurality of recording means for directing laterally movable beams of light through said slits to record on said strip a plurality of curves, each displaced longitudinally by a predetermined distance, and means for recording longitudinally spaced reference lines on said strip, comprising an electric lamp positioned to direct light through one of said slits, a source of current for energizing said lamp, a commutator in series with said source and lamp, a pair of brushes bearing on said commutator at spaced apart areas thereon in the direction of movement of the commutator, said commutator having a brush-contacting portion comprising insulating material and a segment of conductive material of length slightly greater than the spacing between said brushes, whereby said segments contact and interconnect both brushes only momentarily in response to continuous rotation of said commutator thereby connecting said source to said lamp intermittently, and means for rotating said commutator to close said contacts at predetermined intervals.

11. Recording apparatus comprising a light-tight housing having a plurality of recording slits therein, means for moving a light sensitive strip past said slits within said housing, a plurality of recording means for directing laterally moving and laterally constricted beams of light through said slits to record on said strip a plurality of curves, displaced longitudinally by a predetermined amount, the longitudinal position of any point on which is determined by the position of the strip relative to the slits at the instant of recording, and means for recording longitudinally spaced reference lines on said strip coordinated with longitudinal points on one of said curves, comprising means for directing light through a substantial portion of at least one of said slits for a brief interval of time to produce a transverse reference line on said film which is relatively narrow, and means for directing light through a substantial portion of said slit for a longer interval of time to produce a second transverse relatively wide reference line on said film, said second line being distinguishable from said first line because of its greater width.

12. Recording apparatus comprising a light-tight housing having a plurality of recording slits therein, means for moving a light sensitive strip past said slits within said housing, a plurality of recording means for directing laterally moving and laterally constricted beams of light through said slits to record on said strip a plurality of curves, each displaced longitudinally by a predetermined amount, the longitudinal position of any point on which is determined by the position of the strip relative to the slits at the instant of recording, and means for recording longitudinally spaced reference lines on said strip coordinated with longitudinal lines on one of said curves, comprising means for directing a relatively intense light through a substantial portion of one of said slits for a brief interval of time to produce a transverse relatively dense reference line on said film, and means for directing a relatively weak light through a substantial portion of said slit to produce a second relatively light reference line on said film readily distinguishable from said first reference line.

13. A method of determining the nature of the strata traversed by a bore hole comprising the steps of measuring a given characteristic of the strata surrounding the bore hole at various points in the hole, measuring a second characteristic of the strata surrounding the bore hole at various points in the hole, and recording both said characteristics in such fashion that the records of the two measured characteristics are displaced longitudinally by a predetermined amount for purposes of comparison.

14. A method of determining the nature of the strata traversed by a bore hole comprising the steps of measuring at various points in the bore hole the resistivity of the strata in a localized zone surrounding the bore hole, measuring at various points in the bore hole the resistivity of the strata in a more remote zone surrounding the bore hole, and recording both said measured resistivities in such fashion that the two records are displaced longitudinally by a predetermined amount for purposes of comparison.

15. Apparatus for making a plurality of graphic records on a light-sensitive strip comprising a light-tight housing, a moving light-sensitive strip in the housing, and means for recording two variables on said strip at distances spaced along the direction of movement of the sheet, for purposes of comparison.

RAYMOND D. ELLIOTT.